United States Patent
Kang et al.

(10) Patent No.: US 10,044,385 B2
(45) Date of Patent: Aug. 7, 2018

(54) TRANSMITTER FOR CARRIER AGGREGATION

(71) Applicant: ELECTRONICS AND TELECOMMUNICATIONS RESEARCH INSTITUTE, Daejeon (KR)

(72) Inventors: Dong Woo Kang, Daejeon (KR); Cheon Soo Kim, Daejeon (KR); Jang Hong Choi, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 215 days.

(21) Appl. No.: 15/074,881

(22) Filed: Mar. 18, 2016

(65) Prior Publication Data

US 2016/0277049 A1   Sep. 22, 2016

(30) Foreign Application Priority Data

Mar. 20, 2015   (KR) .................. 10-2015-0038793

(51) Int. Cl.
*H04B 1/04* (2006.01)
*H04W 72/04* (2009.01)
*H04B 1/00* (2006.01)

(52) U.S. Cl.
CPC ......... *H04B 1/0483* (2013.01); *H04B 1/0053* (2013.01); *H04B 2001/0491* (2013.01)

(58) Field of Classification Search
CPC ............... H04B 1/0053; H04B 1/0483; H04B 2001/0491
See application file for complete search history.

(56) References Cited

U.S. PATENT DOCUMENTS

| | | | |
|---|---|---|---|
| 8,102,209 B2 | 1/2012 | Jang et al. | |
| 2003/0042984 A1* | 3/2003 | Moloudi | H03B 21/01 330/301 |
| 2008/0159187 A1* | 7/2008 | Van Buren | H04B 7/15542 370/297 |
| 2010/0291888 A1 | 11/2010 | Hadjichristos et al. | |
| 2010/0315168 A1* | 12/2010 | Li | H03F 1/0244 330/310 |
| 2011/0105140 A1 | 5/2011 | Cheon et al. | |
| 2012/0083229 A1* | 4/2012 | Kenington | H04B 1/0483 455/114.3 |
| 2012/0294299 A1 | 11/2012 | Fernando | |

FOREIGN PATENT DOCUMENTS

KR   10-2014-0125130 A   10/2014

OTHER PUBLICATIONS

Chester Sungchung Park et al., "Carrier Aggregation for LTE-Advanced: Design Challenges of Terminals" IEEE Communications Magazine, Dec. 2013, pp. 76-84, vol. 51, IEEE.

* cited by examiner

*Primary Examiner* — Kashif Siddiqui

(57) ABSTRACT

Provided is a transmitter. The transmitter includes a signal combiner configured to amplify a first differential radio frequency (RF) signal modulated to be transmitted through a first frequency band and a second differential RF signal modulated to be transmitted through a second frequency band non-adjacent to the first frequency band and summate the amplified first differential RF signal and the amplified second differential RF signal in a current mode to generate an RF signal and a power amplifier configured to amplify the generated RF signal.

7 Claims, 4 Drawing Sheets

TRANSMITTER FOR CARRIER AGGREGATION

CROSS-REFERENCE TO RELATED APPLICATIONS

This application claims priority under 35 U.S.C. § 119 to Korean Patent Application No. 10-2015-0038793, filed on Mar. 20, 2015, the disclosure of which is incorporated herein by reference in its entirety.

TECHNICAL FIELD

The present invention relates to a transmitted for carrier aggregation (CA), and more particularly, to a transmitter for performing CA in a television (TV) white space frequency band.

BACKGROUND

In a long term evolution-advanced (hereinafter referred to as LTE) mobile communication system, a CA method of adding a component carrier (CC) is used for increasing a data rate of the LTE mobile communication system without affecting a user equipment (UE) using a single carrier. Particularly, the CA method is applied to the LTE mobile communication system from a release 10 version.

The CA method may be categorized into an intra-band CA method, where CCs exist in the same frequency band according to carrier frequency allocation of each of the CCs, and an inter-band CA method where CCs exist in another frequency band.

Moreover, the intra-band CA method may be categorized into a contiguous CA method, where CCs exist in a just adjacent frequency band according to a frequency offset between CCs, and a non-contiguous (or non-adjacent) CA method where CCs exist in a non-adjacent frequency band.

Since network providers are mostly allocated CCs by a unit of 5 MHz to 10 MHz in the same frequency band due to fairness of frequency use, an intra-band non-contiguous CA method or an inter-band CA method is generally implemented rather than an intra-band contiguous CA method.

Recently, new standard is applied to an 802.11af system using a TV white space frequency band. Here, the TV white space frequency band denotes an empty frequency band which is not used by broadcast providers in a very high frequency (VHF) band and an ultra-high frequency (UHF) band which are distributed as bands for TV broadcast. The TV white space frequency band spatially denotes a frequency band which is emptied for avoiding frequency interference between broadcast providers or a frequency band which is not used by districts, and temporally denotes a broadcast frequency which is emptied at a time when a broadcast provider does not transmit broadcast.

Since the TV white space frequency band uses a wideband frequency spectrum of 54 MHz to 698 MHz and an available channel frequency is frequently changed by districts or every use time, it is required to develop a transmitter which are configured with a wideband amplifier and a wideband antenna.

Even in a case of the 802.11af system using the TV white space frequency band, in order to support a non-adjacent CA or a non-contiguous CA, signals of difference channels may be coupled to each other, and a driver amplifier having wideband characteristic is needed. However, a transmitter including a driver amplifier is not developed to date.

SUMMARY

Accordingly, the present invention provides a transmitter for supporting non-contiguous CA in a white space frequency band.

In one general aspect, a transmitter includes: a signal combiner configured to amplify a first differential radio frequency (RF) signal modulated to be transmitted through a first frequency band and a second differential RF signal modulated to be transmitted through a second frequency band non-adjacent to the first frequency band and summate the amplified first differential RF signal and the amplified second differential RF signal in a current mode to generate an RF signal; and a power amplifier configured to amplify the generated RF signal.

Other features and aspects will be apparent from the following detailed description, the drawings, and the claims.

DETAILED DESCRIPTION OF EMBODIMENTS

The advantages, features and aspects of the present invention will become apparent from the following description of the embodiments with reference to the accompanying drawings, which is set forth hereinafter.

However, the present invention may be embodied in different forms and should not be construed as limited to the embodiments set forth herein. Rather, these embodiments are provided so that this disclosure will be thorough and complete, and will fully convey the scope of the present invention to those skilled in the art.

The terms used herein are for the purpose of describing particular embodiments only and are not intended to be limiting of example embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Hereinafter, embodiments of the present invention will be described in detail with reference to the accompanying drawings.

Figure 1:
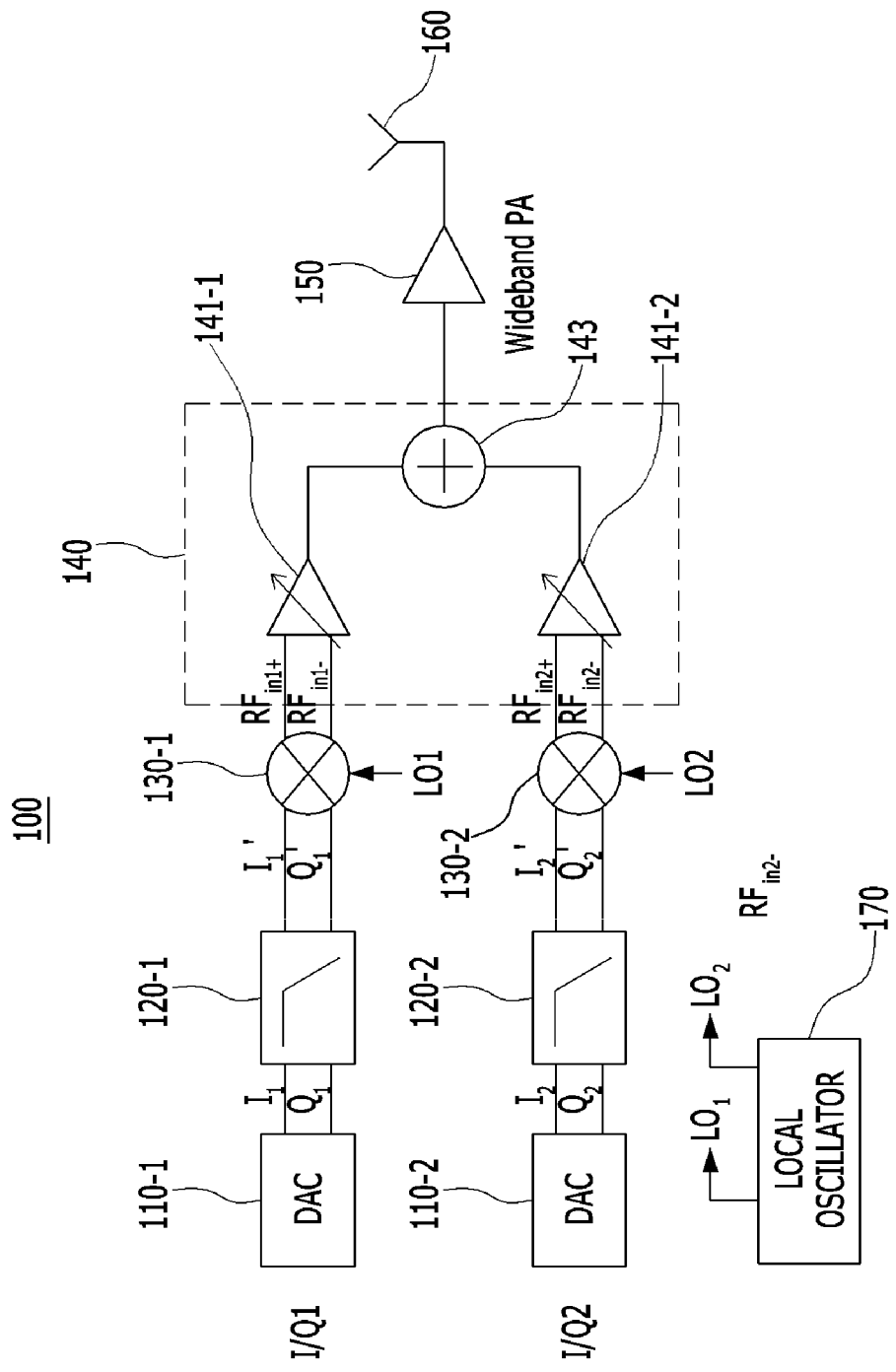
FIG. 1 is a diagram schematically illustrating a configuration of a transmitter according to an embodiment of the present invention.

FIG. 1 is a diagram schematically illustrating a configuration of a transmitter 100 according to an embodiment of the present invention.

Referring to FIG. 1, the transmitter 100 according to an embodiment of the present invention may be referred to as a terminal, an access terminal, a user equipment (UE), a subscriber unit, or a station. The transmitter 100 may include all or some of elements of the terminal, the access terminal, the UE, the subscriber unit, or the station.

The transmitter 100 according to an embodiment of the present invention may be a cellular phone, a personal digital assistant (PDA), a wireless device, a wireless modem, a hand-held device, a laptop computer, a personal computer (PC) card, a compact flash, an external or internal modem, or a corded phone.

The transmitter 100 according to an embodiment of the present invention may be movable or stationary.

The transmitter 100 according to an embodiment of the present invention may communicate with zero, one or a plurality of base stations in a downlink and/or an uplink at a predetermined arbitrary time.

The downlink (or a forward link) may denote a communication link from a base station to the transmitter 100, and the uplink (or a reverse link) may denote a communication link from the wireless communication device 104 to the base station. The uplink and the downlink may each denote a communication link, or may each denote carriers applied to the communication link.

The transmitter 100 according to an embodiment of the present invention may couple radio frequency (RF) signals of different channels to support non-adjacent (or non-contiguous) CA in the white space frequency band. Accordingly, the numbers of power amplifiers and antennas designed by channels are reduced, and the cost and size of a whole system are reduced.

To this end, the transmitter 100 may include a first digital-to-analog (DAC) 110-1, a second DAC 110-2, a first low-pass filter 120-1, a second low-pass filter 120-2, a first mixer 130-1, a second mixer 130-2, a signal combiner 140, a wideband power amplifier (PA) 150, an antenna 160, and a local oscillator 170.

The first DAC 110-1 may convert a first channel signal I/Q1, transmitted through a first frequency band, into a first analog signal. The first channel signal I/Q1 may include an inphase signal I1 and a quadrature signal Q1 that are discrete signals.

The second DAC 110-2 may convert a second channel signal I/Q2, transmitted through a second frequency band non-adjacent (non-contiguous) to the first frequency band, into a second analog signal. The second channel signal I/Q2 may include an inphase signal I2 and a quadrature signal Q2 that are discrete signals.

The first low-pass filter 120-1 may low-pass-filter the first analog signal, and the second low-pass filter 120-2 may low-pass-filter the second analog signal.

The first mixer 130-1 may mix the first analog signal filtered by the first low-pass filter 120-1 with a first local oscillation signal LO1 output from the local oscillator 170 to modulate the first analog signal into a first differential RF signal $RF_{in1}$. The first differential RF signal $RF_{in1}$ may include a first noninversion differential RF signal $RF_{in1+}$ and a first inversion differential RF signal $RF_{in1-}$.

The second mixer 130-2 may mix the second analog signal filtered by the second low-pass filter 120-2 with a second local oscillation signal LO2 output from the local oscillator 170 to modulate the second analog signal into a second differential RF signal $RF_{in2}$. The second differential RF signal $RF_{in2}$ may include a second noninversion differential RF signal $RF_{in2+}$ and a second inversion differential RF signal $RF_{in2-}$.

The signal combiner 140 may amplify (or adjust) the first differential RF signal $RF_{in1}$ and the second differential RF signal $RF_{in2}$ and may summate the amplified first differential RF signal $RF_{in1}$ and the amplified second differential RF signal $RF_{in2}$ in a current mode to generate an RF signal. To this end, the signal combiner 140 may include a first driver amplifier (DA) 141-1, a second DA 141-2, and an adder 143. The first DA 141-1 may amplify (or adjust), by a predetermined gain, the first differential RF signal $RF_{in1}$ modulated by the first mixer 130-1. The second DA 141-2 may amplify (or adjust), by the predetermined gain, the second differential RF signal $RF_{in2}$ modulated by the second mixer 130-2. The adder 143 may operate in the current mode to summate a current component of the amplified first differential RF signal $RF_{in1}$ and a current component of the amplified second differential RF signal $RF_{in2}$. A detailed embodiment of each of the first DA 141-1, the second DA 141-2, and the adder 143 will be described below in detail with reference to FIGS. 2 and 3.

The PA 150 may amplify the RF signal generated by the signal combiner 140 according to a supply voltage supplied from the outside and may transfer the amplified RF signal to the antenna 160.

Hereinafter, a detailed embodiment of the signal combiner 140 illustrated in FIG. 1 will be described in detail.

Figure 2:
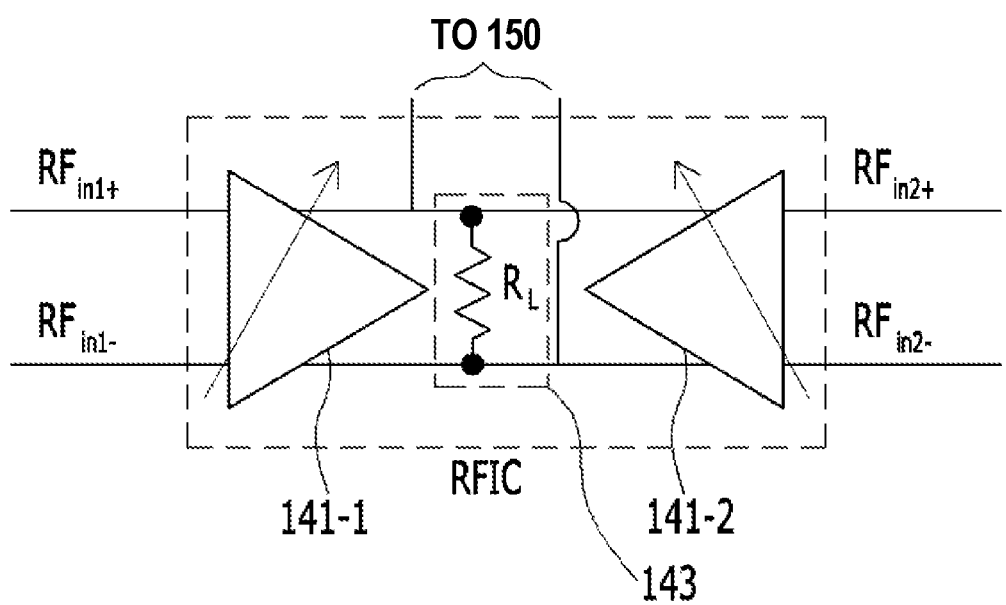
FIG. 2 is a circuit diagram illustrating an embodiment of a signal combiner illustrated in FIG. 1.

FIG. 2 is an example illustrating a circuit configuration of the signal combiner 140 illustrated in FIG. 1.

As illustrated in FIG. 2, each of the first and second DAs 141-1 and 141-2 included in the signal combiner 140 may have a differential input/output structure which includes two input terminals and two output terminals.

The two input terminals may respectively receive the noninversion differential RF signal $RF_{in1+}$ or $RF_{in2+}$ and the inversion differential RF signal $RF_{in1-}$ or $RF_{in2-}$, and the two output terminals may respectively output a current component of the amplified noninversion differential RF signal $RF_{in1+}$ or $RF_{in2+}$ and a current component of the amplified inversion differential RF signal $RF_{in1-}$ or $RF_{in2-}$.

The first and second DAs 141-1 and 141-2 may each operate in the current mode. Here, an operation performed based on the current mode may be construed as the current components included in the first differential RF signal $RF_{in1}$ and the second differential RF signal $RF_{in2}$ being respectively amplified by gains of the first and second DAs 141-1 and 141-2.

The adder 143 included in the signal combiner 140 may be connected to two output terminals of the first DA 141-1 and two output terminals of the second DA 141-2 in common and may summate the current component of the first differential RF signal $RF_{in1}$, amplified by the first DA 141-1 which operates in the current mode, and the current component of the second differential RF signal $RF_{in2}$ amplified by the second DA 141-2 which operates in the current mode.

To this end, as illustrated in FIG. 2, the adder 143 may be implemented with a resistive load $R_L$.

The current component of the first differential RF signal $RF_{in1}$ amplified by the first DA 141-1 and the current component of the second differential RF signal $RF_{in2}$ amplified by the second DA 141-2 may be summated by the a resistive load $R_L$, and the first differential RF signal $RF_{in1}$ and the second differential RF signal $RF_{in2}$ may be amplified to a wideband and may be matched.

The current component of the first differential RF signal $RF_{in1}$ amplified by the first DA 141-1 and the current component of the second differential RF signal $RF_{in2}$ amplified by the second DA 141-2 may be amplified by a gain which is programmably adjusted.

To this end, each of the first and second DAs 141-1 and 141-2 may be implemented with a programmable gain amplifier (PGA) that programmably adjusts a gain. The PGA may be designed with, for example, a complementary metal-oxide semiconductor (CMOS) device.

Moreover, all or some of the circuit elements illustrated in FIG. 2 may be implemented in one or more RF integrated circuits (RFICs), analog ICs, mixed signal ICs, and/or the like. For example, the first and second DAs 141-1 and 141-2 and the resistive load $R_L$ may be implemented in one RFIC.

Figure 3:
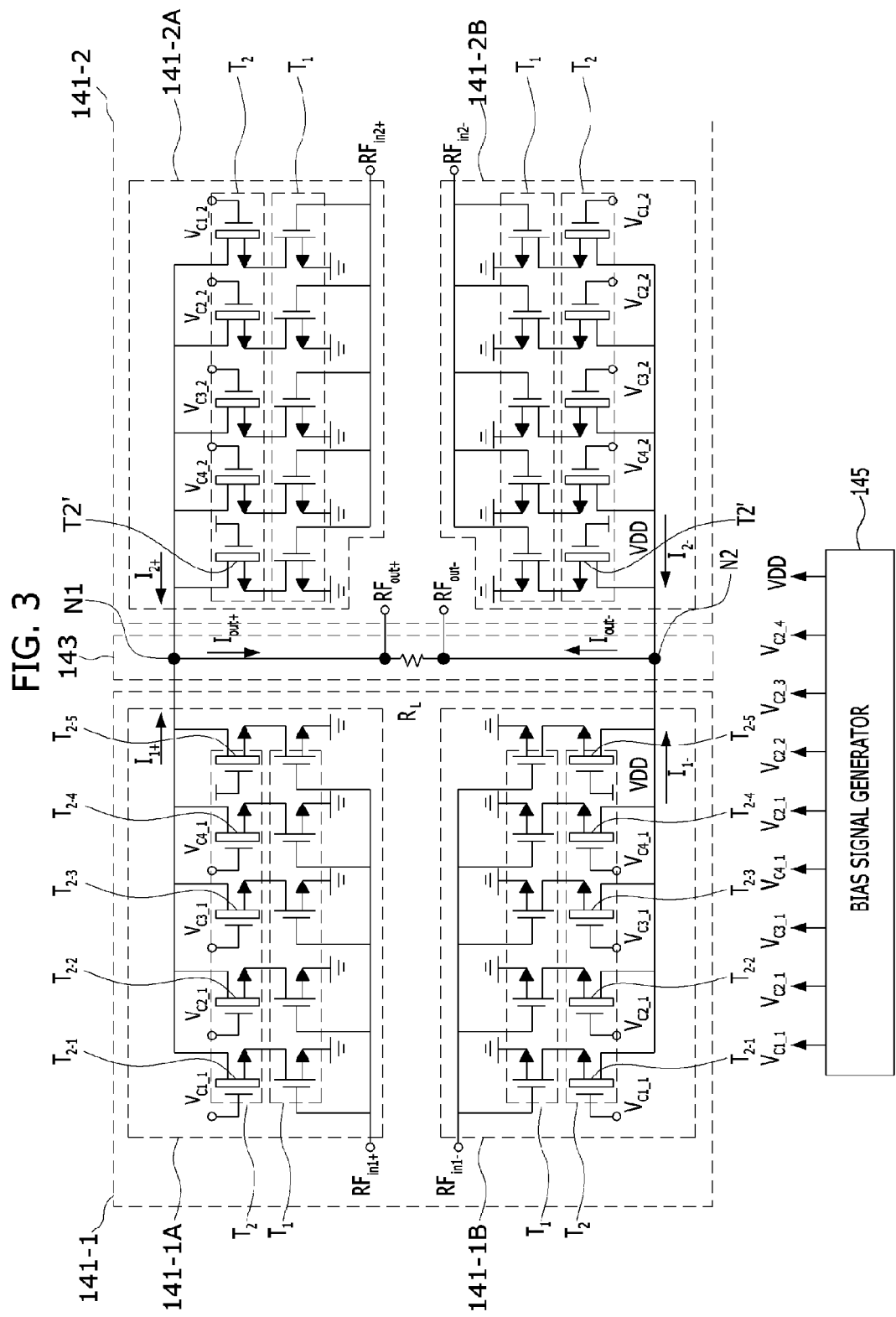
FIG. 3 is a circuit diagram illustrating another embodiment of a signal combiner illustrated in FIG. 2.

FIG. 3 is a circuit diagram illustrating another embodiment of a signal combiner illustrated in FIG. 2.

Referring to FIG. 3, in a case where each of first and second DAs 141-1 and 141-2 is designed with a CMOS device, each of first and second DAs 141-1 and 141-2 may be implemented with a cascode amplifier having a differential input/output structure.

In detail, the first DA 141-1 may include a 1-1st cascode amplifier 141-1A, which receives and amplifies a first noninversion differential RF signal $RF_{in1+}$ of a first differential RF signal $RF_{in1}$, and a 1-2nd cascode amplifier 141-1B which receives and amplifies a first inversion differential RF signal $RF_{in1-}$ of the first differential RF signal $RF_{in1}$.

The second DA 141-2 may include a 2-1st cascode amplifier 141-2A, which receives and amplifies a second noninversion differential RF signal $RF_{in2+}$ of a second differential RF signal $RF_{in2}$, and a 2-2nd cascode amplifier 141-2B which receives and amplifies a second inversion differential RF signal $RF_{in2-}$ of the second differential RF signal $RF_{in2}$.

The 1-1st cascode amplifier 141-1A of the first DA 141-1 may include a plurality of transistor pairs which are connected in parallel between a ground and a first output node N1 included in the adder 143.

Each of the transistor pairs may include a common source transistor T1, which receives the first noninversion differential RF signal $RF_{in1+}$ configuring the first differential RF signal $RF_{in1}$ as an input signal through a gate terminal, and a common gate transistor T2 which is connected to the common source transistor T1 in cascode. A plurality of common gate transistors T2-1 to T2-4 included in each of the transistor pairs may respectively receive bias signals $V_{C1\_1}$ to $V_{C4\_1}$, applied from a bias signal generator 145, though gates thereof. Here, the bias signal generator 145 may be provided inside or outside the signal combiner 140. In FIG. 3, an example where the bias signal generator 145 is included in the signal combiner 140 is illustrated.

The bias signals $V_{C1\_1}$ to $V_{C4\_1}$ respectively applied to the common gate transistors T2-1 to T2-4 may be a voltage of 0V for turning off the common gate transistors T2-1 to T2-4 or a voltage $V_C$ for turning on the common gate transistors T2-1 to T2-4. In this case, the voltage $V_C$ may be fixedly applied to a common gate transistor T2-5 included in one transistor pair. Therefore, the one transistor pair including the common gate transistor T2-5 to which the voltage $V_C$ is fixedly applied may always maintain a turn-on (ON) state.

When all the bias signals $V_{C1\_1}$ to $V_{C4\_1}$ respectively applied to the common gate transistors T2-1 to T2-4 other than the common gate transistor T2-5 are a voltage of 0V, all the transistor pairs other than the one transistor pair including the common gate transistor T2-5 may be turned off (OFF), and thus, a gain of the 1-1st cascode amplifier 141-1A may be adjusted to a smallest value.

On the other hand, when all the bias signals $V_{C1\_1}$ to $V_{C4\_1}$ respectively applied to gates of the common gate transistors T2-1 to T2-4 are the voltage $V_C$, all the transistor pairs may be turned on (ON), and thus, the gain of the 1-1st cascode amplifier 141-1A may be adjusted to a highest value. That is, the gain of the 1-1st cascode amplifier 141-1A may be inversely proportional to the number of common gate transistors which are turned off by a ground voltage.

The 1-2nd cascode amplifier 141-1B of the first DA 141-1 may include a plurality of transistor pairs which are connected in parallel between the ground and a second output node N2 included in the adder 143.

Each of the transistor pairs may include a common source transistor T1, which receives the first inversion differential RF signal $RF_{in1-}$ configuring the first differential RF signal $RF_{in1}$ through a gate terminal, and a common gate transistor T2 which is connected to the common source transistor T1 in cascode.

A plurality of common gate transistors T2-1 to T2-4 included in each of the transistor pairs may respectively receive the bias signals $V_{C1\_1}$ to $V_{C4\_1}$, applied from the bias signal generator 145, through gates thereof.

A gain of the 1-2nd cascode amplifier 141-1B can be sufficiently understood through a method of adjusting the gain of the 1-1st cascode amplifier 141-1A, and thus, its detailed description is not provided.

A 2-1st cascode amplifier 141-2A and a 2-2nd cascode amplifier 141-2B included in the second DA 141-2 may receive signals which differ from signals respectively input to the 1-1st cascode amplifier 141-1A and the 1-2nd cascode amplifier 141-1B, but their operations and functions may be the same as those of the 1-1st cascode amplifier 141-1A and the 1-2nd cascode amplifier 141-1B. Thus, the descriptions of the 1-1st cascode amplifier 141-1A and the 1-2nd cascode amplifier 141-1B are applied to the 2-1st cascode amplifier 141-2A and the 2-2nd cascode amplifier 141-2B.

However, the adder 143 illustrated in FIG. 3 may include a first output node N1, a second output node N2, and a resistive load $R_L$.

The first output node N1 may summate a current component of the first differential RF signal $RF_{in1}$ amplified by the 1-1st cascode amplifier 141-1A and a current component $I_{2+}$ of the second differential RF signal $RF_{in2}$ amplified by the 2-1st cascode amplifier 141-2A according to the Kirchhoff's current law.

The second output node N2 may summate a current component $I_{1-}$ of the first inversion differential RF signal $RF_{in1-}$ amplified by the 1-2nd cascode amplifier 141-1B and a current component $I_{2-}$ of the second inversion differential RF signal $RF_{in2-}$ amplified by the 2-2nd cascode amplifier 141-2B.

The resistive load $R_L$ may connect the first output node N1 to the second output node N2, convert a current component $I_{out+}$ summated by the first output node N1 into a voltage signal, convert a current component $I_{out-}$ summated by the second output node N2 into a voltage signal, and output the voltage signals as RF signals to the PA 150 of FIG. 1.

As described above in the embodiments of FIGS. 1 to 3, the first differential RF signal $RF_{in1}$ amplified by the first DA 141-1 and the second differential RF signal $RF_{in2}$ amplified by the second DA 141-2 may be summated in a current form, and a summated current may be converted into a voltage by the resistive load $R_L$, whereby wideband amplification and impedance matching may be performed.

Figure 4:
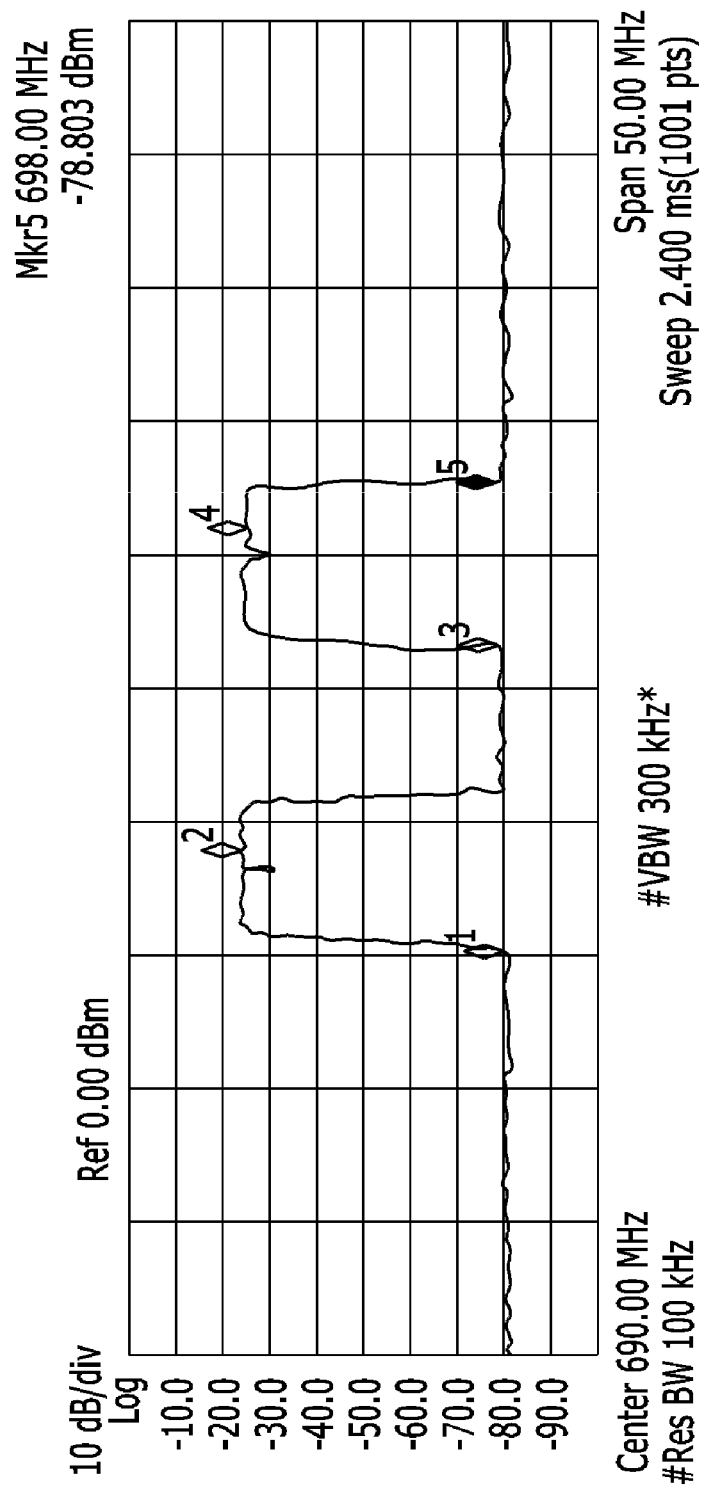
FIG. 4 is a waveform diagram which is obtained by measuring an output signal of a transmitter including a signal combiner according to an embodiment of the present invention with a spectrum analyzer.

As seen in a waveform of FIG. 4, as a result which is obtained by measuring an output signal of the transmitter designed according to the embodiments described above with reference to FIGS. 1 to 3 by using a spectrum analyzer, it can be seen that non-adjacent CA where two channel signals are coupled in a TV white space frequency band of 698.00 MHz is performed.

According to the embodiments of the present invention, since provided is the transmitter that couples RF signals of different channels and matches impedance, a non-adjacent CA or a non-contiguous CA is supported even in a communication system using the white space frequency band, and thus, the numbers of power amplifiers and antennas designed by channels are reduced, and the cost and size of a whole system are reduced.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A transmitter comprising:
    a signal combiner configured to amplify a first differential radio frequency (RF) signal modulated to be transmitted through a first frequency band and a second differential RF signal modulated to be transmitted through a second frequency band non-adjacent to the first frequency band and summate the amplified first differential RF signal and the amplified second differential RF signal in a current mode to generate an RF signal; and
    a power amplifier configured to amplify the generated RF signal,
    wherein the signal combiner comprises:
        a first driver amplifier configured to amplify the first differential RF signal by a predetermined gain;
        a second driver amplifier configured to amplify the second differential RF signal by the predetermined gain; and
        an adder configured to summate a current component of the amplified first differential RF signal and a current component of the amplified second differential RF signal in the current mode, and
    wherein the adder comprises a resistive load configured to convert the summated current component into a voltage component and generate the converted voltage component as the RF signal.

2. A transmitter comprising:
    a signal combiner configured to amplify a first differential radio frequency (RF) signal modulated to be transmitted through a first frequency band and a second differential RF signal modulated to be transmitted through a second frequency band non-adjacent to the first frequency band and summate the amplified first differential RF signal and the amplified second differential RF signal in a current mode to generate an RF signal; and
    a power amplifier configured to amplify the generated RF signal,
    wherein the signal combiner comprises:
        a first driver amplifier configured to amplify the first differential RF signal by a predetermined gain;
        a second driver amplifier configured to amplify the second differential RF signal by the predetermined gain; and
        an adder configured to summate a current component of the amplified first differential RF signal and a current component of the amplified second differential RF signal in the current mode, and
    wherein the first driver amplifier comprises:
        a 1-1st cascode amplifier including a plurality of transistor pairs which are connected to each other in parallel, each of the transistor pairs receiving and amplifying a first noninversion differential RF signal of the first differential RF signal; and
        a 1-2nd cascode amplifier including a plurality of transistor pairs which are connected to each other in parallel, each of the transistor pairs receiving and amplifying a first inversion differential RF signal of the first differential RF signal, and
    the second driver amplifier comprises:
        a 2-1st cascode amplifier including a plurality of transistor pairs which are connected to each other in parallel, each of the transistor pairs receiving and amplifying a second noninversion differential RF signal of the second differential RF signal; and
        a 2-2nd cascode amplifier including a plurality of transistor pairs which are connected to each other in parallel, each of the transistor pairs receiving and amplifying a second inversion differential RF signal of the second differential RF signal.

3. The transmitter of claim 2, wherein each of the transistor pairs comprises:
    a common source transistor including a gate terminal that receives one of the first noninversion differential RF signal, the first inversion differential RF signal, the second noninversion differential RF signal, and the second inversion differential RF signal; and
    a common gate transistor connected to the common source transistor in cascode to be turned on or off according to a bias voltage.

4. The transmitter of claim 2, wherein a gain of each of the first and second driver amplifiers is inversely proportional to number of the common gate transistors that are turned off.

5. The transmitter of claim 2, wherein the adder comprises:
    a first output node configured to summate and output a current component of the first differential RF signal amplified by the 1-1st cascode amplifier and a current component of the second differential RF signal amplified by the 2-1st cascode amplifier;
    a second output node configured to summate a current component of the first inversion differential RF signal amplified by the 1-2nd cascode amplifier and a current component of the second inversion differential RF signal amplified by the 2-2nd cascode amplifier; and
    a resistive load configured to connect the first output node to the second output node, convert a current component summated by the first output node into a voltage signal, convert a current component summated by the second output node into a voltage signal, and output the voltage signals as RF signals.

6. The transmitter of claim 1, wherein each of the first and second driver amplifiers is a cascode amplifier having a differential input and output type.

7. The transmitter of claim 1, wherein each of the first and second driver amplifiers comprises a programmable gain amplifier configured to programmably adjust the predetermined gain.

* * * * *